UNITED STATES PATENT OFFICE.

FRANK S. WASHBURN, OF NASHVILLE, TENNESSEE, ASSIGNOR TO AMERICAN CYANAMID COMPANY, A CORPORATION OF MAINE.

FERTILIZER FORMED BY THE ADDITION OF AMMONIUM SULFATE AND ACID PHOSPHATE TO CALCIUM CYANAMID AND PROCESS OF MAKING SAME.

1,196,910.  Specification of Letters Patent.  Patented Sept. 5, 1916.

No Drawing.  Application filed November 17, 1914. Serial No. 872,625.

*To all whom it may concern:*

Be it known that I, FRANK S. WASHBURN, a citizen of the United States, residing at Nashville, in the county of Davidson and State of Tennessee, have invented certain new and useful improvements in fertilizer formed by the addition of ammonium sulfate and acid phosphate to calcium cyanamid and processes of making same; and I do hereby declare the following to be a full, clear, and exact description of the invention, such as will enable others skilled in the art to which it appertains to make and use the same.

This invention relates to a process of and a product produced by mixing commercial calcium cyanamid or lime nitrogen with ammonium sulfate, and has for its object the production of an improved product which shall be free from certain disadvantages now found to accompany this mixing operation.

To these ends the invention consists in the novel steps constituting my process as well as in the resulting product, all of which will be more fully hereinafter disclosed and particularly pointed out in the claims.

Commercial calcium cyanamid contains about 25 per cent. of calcium present as calcium cyanamid $CaCN_2$ and about 20 per cent. of calcium present as calcium hydroxid $Ca(OH)_2$. In the presence of moisture the calcium cyanamid is converted in part to calcium hydroxid $Ca(OH)_2$ and in part to a double calcium salt having the formula $CaCN_2 \cdot H_2CN_2$ and free cyanamid, $H_2CN_2$, according to the following reactions:

1. $2CaCN_2 + 2H_2O = CaCN_2 \cdot$
$H_2CN_2 + Ca(OH)_2$
2. $CaCN_2 \cdot H_2CN_2 + 2H_2O =$
$2H_2CN_2 + Ca(OH)_2$ When cyanamid is mixed with ammonium sulfate, nitrogen is driven off from the mixture in the form of ammonia, $NH_3$, which ordinarily escapes from the mixture and is lost. This fact, therefore, prevents the use of these two materials in the same mixture.

According to my invention, however, now to be disclosed, the above objection is removed. I have discovered that by adding acid phosphate to the mixture of cyanamid and ammonium sulfate the loss of nitrogen is prevented. This I have found is due to two reactions; first, the reaction of calcium in the cyanamid with acid phosphate whereby the calcium is fixed in the form of acid or neutral phosphates, in which form it is no longer active toward ammonium sulfate in setting free ammonia; and, second, the reaction whereby the ammonia set free by the interaction of the cyanamid and ammonium sulfate is combined with acid phosphate as an ammonium phosphate and calcium ammonium phosphate. This can be more readily understood from the following equations:—

3. $2CaCN_2 + 2H_3PO_4 =$
$Ca_2H_2P_2O_8 + 2H_2CN_2$
4. $2Ca(OH)_2 + 2H_3PO_4 =$
$Ca_2H_2P_2O_8 + 4H_2O$
5. $CaCN_2 + CaH_4P_2O_8 =$
$Ca_2H_2P_2O_8 + H_2CN_2$
6. $Ca(OH)_2 + CaH_4P_2O_8 =$
$Ca_2H_2P_2O_8 + 2H_2O$
7. $NH_3 + H_3PO_4 = NH_4H_2PO_4$
8. $2NH_3 + CaH_4P_2O_8 = Ca(NH_4)_2H_2P_2O_8$

The freed ammonia is not only taken up and fixed by my process, but the cause of the ammonia liberation, is eliminated.

It will be seen that my process enables me to obviate the above objection, of loss of ammonia on mixing cyanamid with ammonium sulfate. Moreover, the product produced differs from the cyanamid in that it no longer tends to liberate ammonia from ammonium sulfate.

What I claim is:—

1. The process of making a fertilizer mixture which consists in mixing commercial calcium cyanamid with ammonium sulfate and adding sufficient acid phosphate to the mixture to prevent the escape of ammonia, substantially as described.

2. The herein described new fertilizer containing the reaction products of commercial calcium cyanamid, ammonium sulfate and acid phosphate, substantially as described.

3. The process of making a fertilizer which consists in mixing commercial calcium cyanamid with ammonium sulfate and adding to said mixture a sufficient quantity of a fertilizer material having an acid radical so combined as to be capable of reaction with any ammonia that may be liberated, substantially as described.

4. The process of making a fertilizer which consists in mixing commercial calcium cyanamid with ammonium sulfate and adding to said mixture a sufficient quantity of a fertilizer phosphatic material having an acid radical so combined as to be adapted to react with any ammonia that may be liberated, substantially as described.

In testimony whereof I affix my signature, in presence of two witnesses.

FRANK S. WASHBURN.

Witnesses:
G. A. SCHURMAN,
A. D. WHITTEMORE.